O. A. GALE.
DEVICE FOR CONSERVING CORD AND TWINE.
APPLICATION FILED SEPT. 6, 1918.

1,350,602.

Patented Aug. 24, 1920.

INVENTOR
Oscar A. Gale

ATTORNEY

UNITED STATES PATENT OFFICE.

OSCAR A. GALE, OF EATON, OHIO.

DEVICE FOR CONSERVING CORD AND TWINE.

1,350,602.  Specification of Letters Patent.  Patented Aug. 24, 1920.

Application filed September 6, 1918. Serial No. 252,919.

*To all whom it may concern:*

Be it known that I, OSCAR A. GALE, a citizen of the United States, and a resident of Eaton, in the county of Preble and State of Ohio, have invented certain new and useful Improvements in Devices for Conserving Cord and Twine, of which the following is a specification.

My invention relates to improvements in display devices, being more particularly an improvement in means for suspending odd lengths of cord and the like to conserve the same especially in connection with post-office work, and it consists in the constructions, combinations and arrangements herein described and claimed.

An object of my invention is to provide a movable rack which has a plurality of spring clips, into which odd lengths of cord and twine may be sprung temporarily, so that they may be within reach for re-use, thereby avoiding the waste of such materials by throwing them on the floor where they are swept up and destroyed.

Other objects and advantages will appear in the following specification, reference being had to the accompanying drawing, in which—

By way of preface it should be stated that this device is designed especially for use in postoffices, and more particularly for the purpose of conserving the cord and twine which is taken from packages. Usually the practice is to throw this material on the floor where it is lost. With this invention, the cord and twine is hung up within easy reach so that it can be used again.

While the invention is intended to be used in the connection just stated, it also may be used for other purposes such as displaying articles in stores, etc.

Referring now to the construction, a cabinet A or like support forms the mounting for brackets B and D. These brackets are screwed or otherwise secured in place, and have recesses 1 and 5 respectively, which face each other for the reception of the ends of a non-circular slide bar C.

Slidably mounted upon the bar C is a sliding rack E. This rack may be slid to either end of the slide bar so that the lengths of twine carried by the spring clips or twine holders F may be brought into convenient reach. For this purpose the slide bar C may be made as long as desired so that any specified region may be covered.

A plurality of rectangular keepers or loops H receive the heads 8 of the spring clips. Thumb screws G may be used to prevent the accidental displacement of the spring clips, although the frictional engagement of the heads 8 with the keepers is sufficient to prevent the spring clips from pulling out under ordinary conditions.

Each spring clip consists simply of a piece of spring metal bent upon itself into a substantially U-shaped member. The free ends are flared outwardly at 2 so as to provide a wide entrance for the bits of twine 9. In actual practice the various spring clips F can be employed to hold various sizes of cord and twine, thereby in a measure grading this material so that suitable pieces may more readily be selected for various purposes.

In order to temporarily store such quantities of cord that have accumulated in any one or a number of the spring clips F, one or more deep hooks 12 are provided on the rear of the bracket D. The hooks 12 are large enough to hold a considerable quantity of cord, and when they are full the cord is taken off either to be packed away, shipped to some other point or used for some other purpose.

Figure 10:
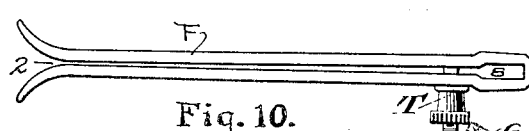
Fig. 10 is a plan view of one of the spring clips showing a slight modification and Fig. 11 is a perspective view illustrating a modification in the sliding rack.

The modification in Fig. 10 illustrates the use of a thumb screw T in connection with one of the spring clips F. This thumb screw is for the purpose of increasing the tension between the tangs of the spring clip.

Figure 11:
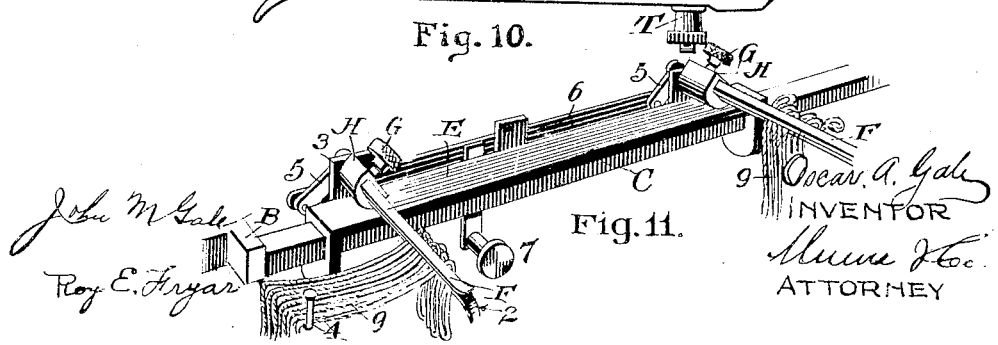

The modification in Fig. 11 is adapted more particularly for use in railway post-offices, although the first form of the invention may be employed in this connection if desired. The principal departure in this form of the invention consists of journaling the keepers H on lugs 3 of the sliding rack E, so that the spring clips F can be turned into either of two positions.

This arrangement is desirable, since in railway postoffices the slide bar C is ordinarily mounted on a case of mail pigeon holes. While the sliding rack E is in any of the intermediate positions, it can be readily moved aside so that the suspended cord may be moved away to make the pigeon holes therebeneath accessible.

Figure 1:
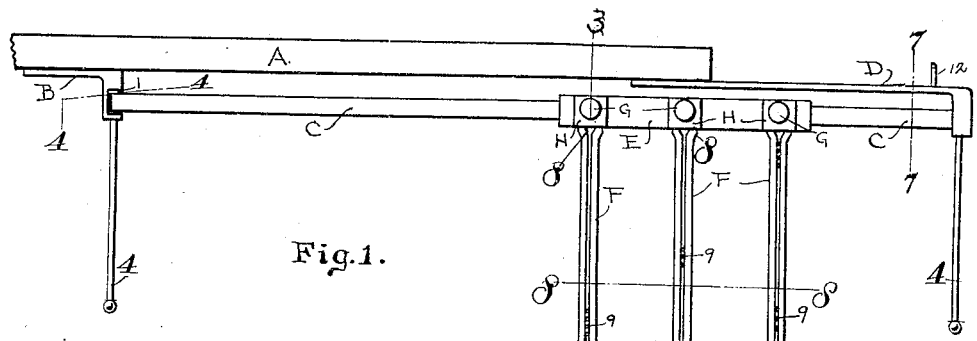
Figure 1 is a plan view of the device.
Figure 2:
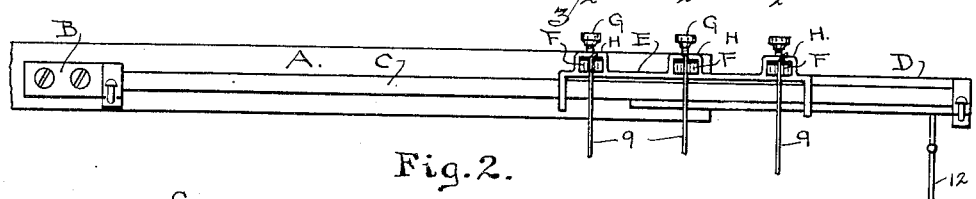
Fig. 2 is a front elevation showing the manner of mounting the device on a cabinet or similar structure.
Figure 3:
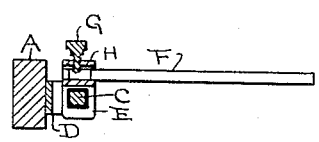
Fig. 3 is a cross section on the line 3—3 of Fig. 1.
Figure 4:
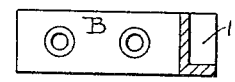
Fig. 4 is a detail section on the line 4—4 of Fig. 1.
Figure 5:
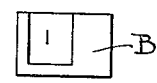
Fig. 5 is a detail view of the bracket at one end.
Figure 6:
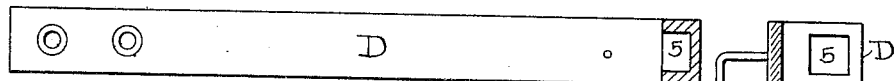
Fig. 6 is a detail view of the bracket at the other end.
Figure 8:
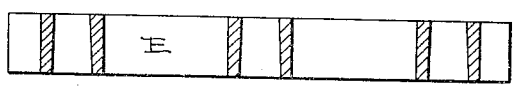
Fig. 8 is a cross section on the line 8—8 of Fig. 1.
Figure 7:
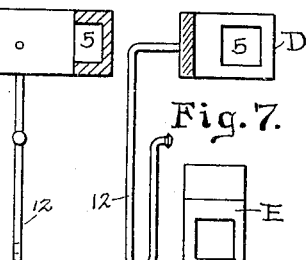
Fig. 7 is a cross section of said bracket on the line 7—7 of Fig. 1.
Figure 9:
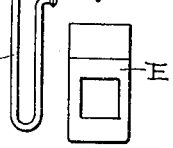
Fig. 9 is an end elevation of the sliding rack.

When the sliding rack happens to be at either end of the slide bar C, the spring clips are turned into the direction of the adjacent supporting bracket, so that when the mass of suspended cord in the nearest spring clip is thrown over the arm 4 of the adjacent bracket, the cord can be pulled out more easily. It is easier to pull lengths of cord out of the spring clip with the kerf of the spring clip inclined toward the arm, than it is to pull a length of cord out with the kerf in the perpendicular position shown in Fig. 2.

Each keeper H has a handle 5. The handles are connected by a bar 6 with the finger-piece 7 by means of which the bar is actuated to turn the keepers.

While the construction and arrangement of the device herein described and illustrated is that of a generally preferred form, obviously modifications and changes may be made without departing from the spirit of the invention or of the scope of the claims.

I claim:

1. A device for conserving wrapping twine, consisting of a slide bar non-circular in cross section, means including supporting brackets arranged to provide a fixture for the slide bar, a traveling rack slidable on the bar, including apertured ears receiving the bar, spring clip holding means on the rack including keepers and thumb screws, and spring clips having heads at one end insertible in said keepers, and provided with flared free ends to facilitate the introduction of a length of twine.

2. A device for conserving wrapping twine, consisting of a slide bar, brackets for holding the slide bar in place, a sliding rack movable upon the slide bar, spring clips frictionally mounted upon the sliding rack and adapted to hold lengths of twine, means including a hook on one of the brackets for temporarily holding accumulations of twine when removed from the spring clips and an arm on each bracket permitting the mass of twine suspended from said spring clips to be flung thereover when the rack is at either end of the slide bar.

3. A device for conserving wrapping twine, consisting of a rectangular bar of any desired length carrying a movable sleeve of rectangular pipe, into the upper face of which are molded, or inserted a plurality of rectangular lugs to receive and hold in place clutches or clips of spring steel or wire, into which may be placed and held short lengths of twine, substantially as described.

OSCAR A. GALE.